United States Patent [19]

Strother

[11] Patent Number: 4,888,875
[45] Date of Patent: Dec. 26, 1989

[54] LEVEL FOR WEIGHTLIFTING

[76] Inventor: John M. Strother, 1863 13th St., Apt. #2, Akron, Ohio 44223

[21] Appl. No.: 118,855

[22] Filed: Nov. 9, 1987

[51] Int. Cl.$^4$ .............................................. G01C 9/28
[52] U.S. Cl. ...................................... 33/347; 33/334; 33/371; 33/DIG. 1; 272/DIG. 5
[58] Field of Search ................ 33/347, 333, 334, 371, 33/390, DIG. 1, 381, 365; 272/122, 123, DIG. 5

[56] References Cited

U.S. PATENT DOCUMENTS

| | | | |
|---|---|---|---|
| 685,569 | 10/1901 | Bullard | 33/365 |
| 1,488,419 | 3/1924 | Ward | 33/381 |
| 2,535,791 | 12/1950 | Fluke | 33/347 |
| 2,789,363 | 4/1957 | Miley | 33/347 |
| 3,046,672 | 7/1962 | Lace | 33/347 X |
| 3,832,782 | 9/1974 | Johnson et al. | 33/390 X |
| 4,709,922 | 12/1987 | Slade, Jr. et al. | 272/123 |

Primary Examiner—William A. Cuchlinski, Jr.
Assistant Examiner—Thomas B. Will
Attorney, Agent, or Firm—Oldham & Oldham Co.

[57] ABSTRACT

An instrument used to level equipment, particularly useful with exercise equipment like a barbell. In preferred form, the instrument includes a tapered tube filled with a liquid and having a ball therein indicating level. The tube is supported and is magnetically coupled to a metal surface such as the barbell. The use of the leveling instrument with a barbell facilitates weight training in that the bar may be maintained level and the muscles on each side of the body developed equally.

7 Claims, 1 Drawing Sheet

LEVEL FOR WEIGHTLIFTING

BACKGROUND OF THE INVENTION

The present invention generally relates to a leveling device which can be applied to various existing equipment, to level and facilitate proper use of the equipment. More specifically, the invention relates to the use of a level designed to be used with conventional exercise equipment including barbells.

It has long been the practice among weight training enthusiasts to conduct their training using such barbell equipment. Generally speaking, such equipment includes an elongated cylindrical metallic bar, along with circular, plate-like weights removably positioned adjacent the ends of the bar. A variety of lifts can be performed using such equipment, and for this purpose the trainee can either be standing or laying in a supine position on a weight bench for example. Particular exercises, using barbells can develop the biceps and triceps of the arms, the deltoid and pectoral muscles of the shoulders and chest, and other muscles of the upper body.

It has been found, that when exercising with free weights and a barbell in this manner, various problems have been encountered. For example, when exercising, the trainee may tend to lift the weight on the barbell favoring the dominate side of his body. Thus, if a person is right handed, the tendency may be to lift more with the right side of the body when using free weights. In this way, the trainee's body naturally develops more on the right side, yielding undesired effects from the weight training exercises.

It has also been found, that it is desirable to be able to perform the exercises without a helper to keep the bar straight. Also, for beginning weight trainees, it is desirable to learn the correct way to perform the exercises, so as to yield the desired results of muscle development. For both beginning and experienced weight trainees, having too much weight on the barbell is a common problem which may lead to accidents or injury. A good indication of having too much weight on the barbell, is if the trainee is not able to keep the barbell level while performing the exercises.

Another problem encountered when training with free weights, is the necessity to balance the weights on each end of the barbell so that the weight is over the center of the bar to reduce the risk of accidents or injuries resulting from an unbalanced barbell.

SUMMARY OF THE INVENTION

Accordingly, in view of the above problems encountered in the field of exercising with free weights, the present invention provides a level which can be attached directly to the barbell for maintaining the bar at a level position while exercising. In this way, the trainee may easily recognize if the bar is uneven while the exercise is performed. By keeping the bar level during performance of the exercises, no favoritism to one side of the body or the other is given when training. In this way, the muscles are forced to develop equally during training. Also by using the level of the present invention, a helper is not necessary to keep the barbell straight during exercising, and beginning trainees will be able to perform the exercises correctly by keeping the barbell level, and thereby receiving the most benefit from the exercise.

Another object of the present invention is to provide a level used in conjunction with the barbell, giving an indication to a trainee if there is too much weight on the barbell. If the trainee cannot keep the barbell level while performing the exercises, this indicates that there is too much weight on the barbell, and adjustment should be made. In this way, by use of the level of the present invention, the weight on the barbell may be regulated to avoid possible accident or injury to the trainee by having too much weight on the bar.

Another object of the present invention, is to provide a method of balancing the weight over the center of the bar when the free weights are put on the barbell. It is essential that the weight is over the center of the bar to reduce risk of accidents resulting from an unbalanced bar, and by use of the level of the present invention, this balance may be checked.

The level of the present invention, comprises a leveling tube or vial containing a liquid, and having a level indicator placed in the liquid. As found in conventional leveling instruments, the level indicator may be a bubble within the liquid, or perferably is a steel ball which will rest at the center of the tube or vial when level. In the preferred embodiment, the tube is tapered from the ends to form a thicker mid-portion where the steel ball will rest when the tube is level. The level also comprises, two supports at each end of the tube made of a non-magnetic material and having magnetic inserts, so that the structure may be secured to a metal surface. The supports and magnetic inserts may be formed in a semi-circular shape to facilitate securing to a barbell specifically, or a curved metal surface.

BRIEF DESCRIPTIONS OF THE DRAWINGS

Other objects and advantages of the present invention will be apparent from the following description taken in conjunction with the accompanying drawings, in which.

DESCRIPTION OF THE PREFERRED EMBODIMENT

Figure 1:
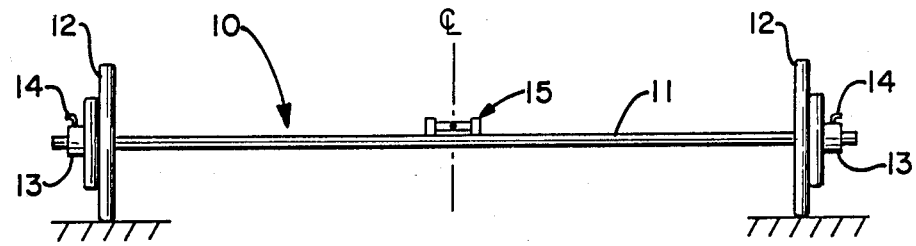
FIG. 1 is a front elevational view of a barbell with the level of the present invention placed at the center thereof.

Referring now specifically to the drawings, the embodiment of the invention as disclosed is shown in FIG. 1, and is associated with the weight training apparatus, or barbell, generally designated by reference numeral 10. The barbell includes an exercise bar or weight bar 11 of conventional construction which as a plurality of weight plates 12 mounted thereon in a conventional manner. The plates 12, or "free weights", are mounted on the bar and secured in place by conventional removable collars 13 and tightening pins 14. The weights 12, may be removed and replaced on the bar in the conventional manner. Also shown in the level 15 of the present invention mounted at the center line of the barbell, providing an indication of the levelness or pitch of the bar while exercising therewith, or placing the weights 12 upon the bar.

Figures 2, 3:
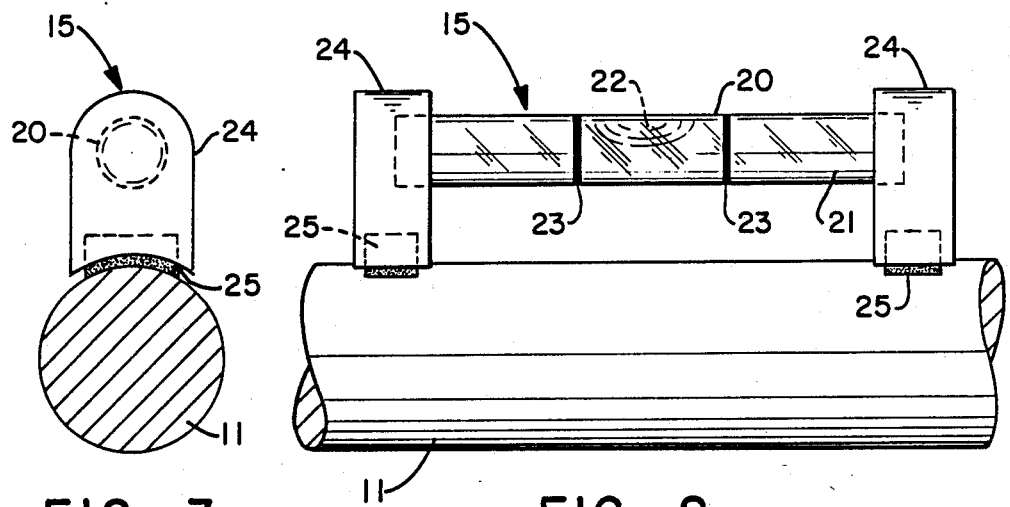
FIG. 2 is an enlarged front elevational view of the level of the present invention, and the features thereof.
FIG. 3 is an enlarged side elevational view, partially in section of the level of the present invention and a portion of the barbell.

More specifically, the level 15 of the present invention can be seen in FIG. 2 mounted upon the bar 11 of the exercising equipment or barbell 10, as shown in FIG. 1. The level comprises a tube or vial 20 containing a liquid 21 and having a suitable means to indicate the levelness of the tube, such as a bubble of air 22. The tube is also marked with graduations 23, to specifically indicate that the tube or vial is level when the leveling means 22 is therebetween. In conjunction with the tube 20, supports 24 are provided at each end thereof, and support the tube above the bar 11 so as to be easily visable to the trainee using the barbell. The supports 24, are secured to the bar 11 by magnetic inserts 25. The magnetic inserts 25 are placed in the bottom ends of the supports 24, so as to secure and support the tube 20 above the bar 11 as described heretofore. As seen more clearly in FIG. 3, the magnetic inserts 25 and supports 24 are formed in a curved, semi-circular way so as to conform to the curved surface of the bar 11. It is also embodied in the level described above, to utilize a liquid 21 which has a viscosity such that the leveling means, or bubble 22 only moves slowly through the liquid. In this way, the sharp movements of the trainee during exercising, do not effect the level indication to a great degree, and thereby an accurate indication of the general levelness of the bar 11 may be observed throughout the extent of the particular exercises performed by the trainee.

Figure 4:
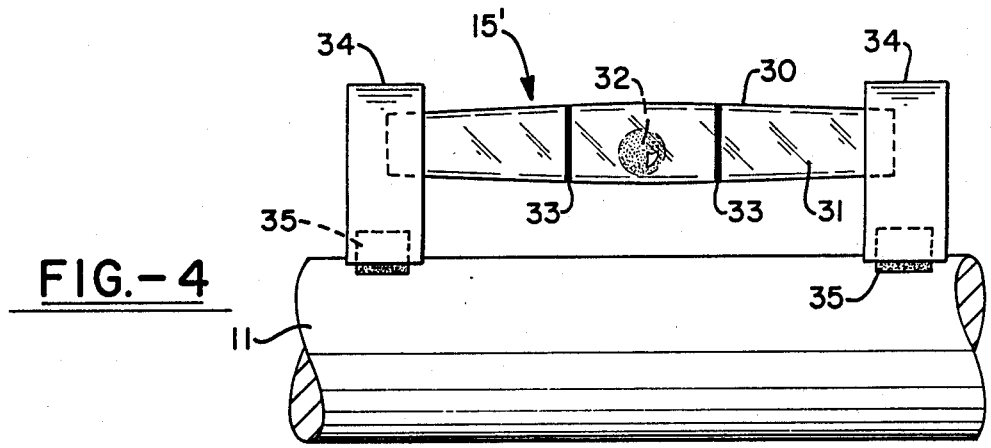
FIG. 4 is an enlarged front elevational view of another embodiment of the level of the present invention.

Turning now to FIG. 4, which shows an alternate embodiment of the present invention, a level 15' is provided for attachment to a bar 11 of a barbell. The level 15', comprises a tube or vial 30, having a liquid 31 and a leveling means 32 therein. The leveling means 32 in this embodiment, comprises a steel ball with a diameter less than that of the tube 30. The tube is tapered from the end thereof to the center, so as to provide a thicker mid-portion, and a greater diameter at the center of the tube. In this way, the steel ball 32 tends to roll towards the center of the tube 30, and rest at center thereof when in a level position. Again, the tube is marked with graduations 33 to indicate to the trainee levelness of the bar 11. In this embodiment, the tube 30 is supported and secured to the bar in the same way as shown in FIG. 2, with supports 34 and magnetic inserts 35. As is evident from the structure of this embodiment of the present invention, by providing a tapered tube 30, and a heavier leveling means in the steel ball 32, there is resistance to sharp changes in the indication of the levelness of the bar 11 corresponding to the sharp movements of the trainee during exercising. Accordingly, a variety of alternate means may be used as the leveling means in the present invention. For example, a hollow tubular means or capsule might be used to only respond to changes from horizontal in the lateral direction or along the bar. Again, the level indicator is embodied to be designed to have some resistance to sharp movements of the trainee through a combination of leveling means and fluid viscosity as appropriate.

As is readily seen, the present invention provides a unique instrument for determining the level or pitch relationships of equipment or surfaces to which it is attached. Specifically, the leveling device may be attached to a barbell to provide an indication of the levelness of the bar, so as to equalize the weight across the arms of a trainee during exercising. In this way, the trainee will be sure to perform the exercises correctly, and will be able to regulate the weight on the bar if they are not able to keep it level. Thus, the level of the present invention, provides a device to improve training with free weights and to reduce or avoid the risk of accidents resulting from overweight or unbalanced bars.

The invention being thus described, it is evident that the same may be varied in many ways. Such variations are not to be regarded as a departure from the spirit and scope of the invention and the embodiments described are intended to cover all such modifications that fall within the true spirit and scope of the invention. For example, the supports and magnetic inserts may be formed in another shape to conform to another surface, or may be dispensed with altogether and an appropriate magnetic insert or extension molded directly to the tube or vial. In this way, the tube will be placed directly on the weight bar. Accordingly, the foregoing description of the preferred embodiment is not to be construed as limiting the scope of this invention as defined in the appended claims.

What is claimed is:

1. A leveling device for use with an exercise device comprising, tube means containing a liquid and leveling means in said liquid for determining level or pitch;

magnetic means associated with said tube means and exposed so as to secure said leveling device to said exercise device, wherein said magnetic means are shaped so as to correspond to a surface of said exercise device;

means to inhibit rapid movement of said leveling means within said tube means to facilitate the determination of the level relationship of said exercise device during movement thereof;

said tube means being continuously observable such that the relationship of said exercise device to level may be continuously observed as said exercise device is used during exercise.

2. A leveling device as in claim 1, wherein, said tube means is tapered from each end thereof so as to form a thicker mid-portion to facilitate inhibiting rapid movement of said leveling means in said tube means.

3. A leveling device as in claim 1, wherein, said leveling means comprises a bubble in said liquid which rests at a mid-portion of said tube means when level.

4. A leveling device as in claim 1, wherein, said leveling means comprises a ball placed in said liquid which rests at a mid-portion of said tube means when level.

5. A leveling device as in claim 1, wherein, said means to inhibit rapid movement of said leveling means comprises a viscous liquid, the viscosity of which will prevent rapid movement of said leveling means within said tube means.

6. A leveling device as in claim 1, wherein, said magnetic means is associated with a supports means supporting said tube means and being constructed of a non-magnetic material.

7. A leveling device as in claim 4, wherein, said tube means is tapered from each end thereof so as to form a thicker mid-portion and said means to inhibit rapid movement of said leveling means comprises a viscous liquid which in conjunction with said tapered surfaces of said tube means will prevent rapid movement of said ball within said tube means.

* * * * *